(12) United States Patent
Jeon et al.

(10) Patent No.: US 9,019,465 B2
(45) Date of Patent: Apr. 28, 2015

(54) LIQUID CRYSTAL LENS

(71) Applicant: LG Chem, Ltd., Seoul (KR)

(72) Inventors: Byoung Kun Jeon, Daejeon (KR); Su Young Ryu, Daejeon (KR); Moon Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/251,183

(22) Filed: Apr. 11, 2014

(65) Prior Publication Data

US 2014/0218649 A1     Aug. 7, 2014

Related U.S. Application Data

(63) Continuation of application No. PCT/KR2013/001014, filed on Feb. 7, 2013.

(30) Foreign Application Priority Data

Feb. 7, 2012 (KR) .......... 10-2012-0012105
Feb. 7, 2013 (KR) .......... 10-2013-0014006

(51) Int. Cl.
| | |
|---|---|
| G02F 1/13 | (2006.01) |
| G02B 27/26 | (2006.01) |
| G02F 1/1337 | (2006.01) |
| G02F 1/1335 | (2006.01) |
| G02B 27/22 | (2006.01) |

(52) U.S. Cl.
CPC .............. *G02B 27/26* (2013.01); *G02F 1/1337* (2013.01); *G02F 1/133528* (2013.01); *G02B 27/225* (2013.01); *G02F 2001/133742* (2013.01)

(58) Field of Classification Search
USPC .................................................. 349/175, 200
See application file for complete search history.

(56) References Cited

U.S. PATENT DOCUMENTS

2011/0205342 A1   8/2011   Lin et al.

FOREIGN PATENT DOCUMENTS

| KR | 10-2003-0087310 | 11/2003 |
|---|---|---|
| KR | 10-2003-0088244 A | 11/2003 |
| KR | 10-2005-0119140 A | 12/2005 |
| KR | 10-2006-0058406 | 5/2006 |
| KR | 10-2008-0084527 | 9/2008 |
| KR | 10-2010-0013179 | 2/2010 |
| TW | 200932880 A | 8/2009 |
| TW | 201041967 A1 | 12/2010 |

*Primary Examiner* — Phu Vu
(74) *Attorney, Agent, or Firm* — McKenna Long & Aldridge, LLP (57) ABSTRACT

Provided are a liquid crystal lens, an optical filter, and a display device. The exemplary liquid crystal lens may exhibit optical anisotropy and optical isotropy according to a polarization state of incident light. When the liquid crystal lens is applied to a display device capable of generating a 2D image and a 3D image, the 3D image may be seen without glasses in the state of the optical anisotropy, and the 2D image can be seen in the state of the optical isotropy.

14 Claims, 6 Drawing Sheets

| UR | UL | UR | UL | UR |

Fig. 6

| UR | UL | UR | UL | UR |
|----|----|----|----|----|
| UL | UR | UL | UR | UL |
| UR | UL | UR | UL | UR |
| UL | UR | UL | UR | UL |
| UR | UL | UR | UL | UR |

LIQUID CRYSTAL LENS

CROSS-REFERENCE TO RELATED APPLICATION

This application is a Continuation Bypass of International Application PCT/KR2013/001014, with an international filing date of Feb. 7, 2013 which claims priority to and the benefit of Korean Patent Application No. 10-2012-0012105, filed on Feb. 7, 2012, and Korean Patent Application No. 10-2013-0014006, filed on Feb. 7, 2013, all of which are incorporated herein by reference in their entirety.

TECHNICAL FIELD

The present application relates to a liquid crystal lens, an optical filter, and a display device.

BACKGROUND

Generally, a display device displays a two-dimensional image (hereinafter, referred to as "2D image"). Recently, according to increased demands for a three-dimensional image (hereinafter, referred to as "3D image") in the field of a game or movie, a display device displaying 3D images is being developed. A 3D image is recognized by inputting a pair of 2D images to both eyes of an observer, and fusing the input images in the brain of the observer.

A 3D image display device (hereinafter, referred to as "3D device") may be classified into a stereo-scopic device and an auto stereo-scopic device. In the auto stereo-scopic device, a parallax barrier-type device disclosed in Patent Document 1 or a lenticular lens-type device disclosed in Patent Document 2 is generally used.

PRIOR ART DOCUMENT (Patent Document 1) Korean Patent Application Publication No. 10-2005-0119140
(Patent Document 2) Korean Patent Application Publication No. 10-2003-0088244

DETAILED DESCRIPTION

Technical Object

The present application is directed to providing a liquid crystal lens, an optical filter, and a display device.

Technical Solution

One aspect of the present application provides a liquid crystal lens including a lens layer. The lens layer may include a region including liquid crystal molecules. The liquid crystal molecule may be included in the region, for example, in a crosslinked or polymerized state.

Figure 1:
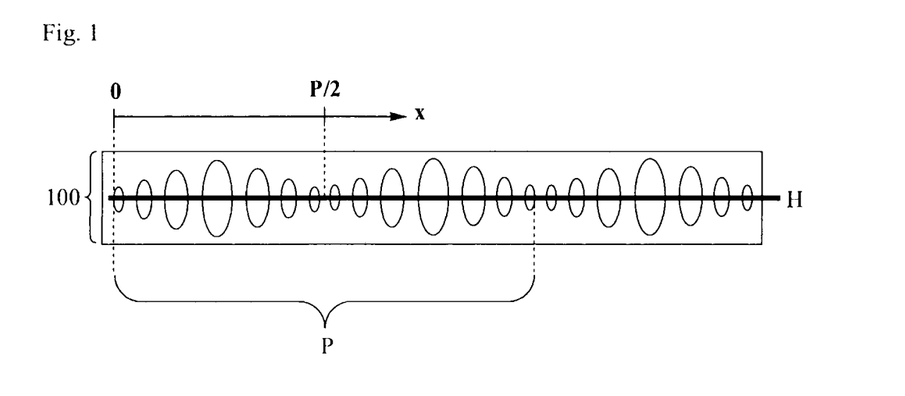
FIG. 1 is a schematic diagram of a cross-section of a cholesteric alignment region of an exemplary lens layer.

In one example, the region may be a cholesteric alignment region. The cholesteric alignment region 100 may include, as shown in FIG. 1, cholesteric liquid crystal molecules. The cholesterically-aligned liquid crystal molecules form a helical structure by stacking the liquid crystal molecules in a layer and twisting directors of the liquid crystal molecule along a helical axis H. In the helical structure, a distance until the director of the liquid crystal molecule rotates a full 360 degrees refers to a pitch P.

The cholesteric alignment region may be a planar alignment region, a homeotropic alignment region, or a focal conic alignment region. The planar alignment region may be a region in which a helical axis of the region is perpendicular to a surface of the lens layer. The homeotropic alignment region may be a region in which a helical axis of the region is parallel to a surface of the lens layer. In addition, the focal conic alignment region may be a region in which a helical axis of the region is neither perpendicular nor horizontal to a surface of the lens layer. When the term "vertical, parallel, perpendicular, or horizontal" is used to define an angle in the specification, it refers to substantially vertical, parallel, perpendicular, or horizontal without damaging a desired effect, including, for example, an error considering a production error or variation. For example, this term may include an error within approximately ±15, ±10, or ±5 degrees.

In one example, the cholesteric alignment region may be a homeotropic alignment region. The homeotropic alignment region may have a helical axis H formed to be parallel to a surface of the lens layer as shown in FIG. 1.

The homeotropic alignment region may have periodical refractive index distribution with respect to linearly-polarized light perpendicular to the helical axis thereof. The region may have, for example, refractive index distribution on a period of a ½ pitch. In one example, the region may have a refractive index distribution calculated by Equation 1.

$$n_{\textit{eff}}(x) = n_e n_o / (n_e^2 \cos^2\theta(x) + n_o^2 \sin^2\theta(x))^{1/2} \quad [\text{Equation 1}]$$

In Equation 1, x is a coordinate of the cholesteric alignment region, which is an optional number between 0 to P/2. Here, P is a pitch of the cholesteric alignment region, $n_{\textit{eff}}(x)$ is a refractive index of the cholesteric alignment region with respect to the linearly-polarized light at the x point, $n_e$ is an extraordinary refractive index of the liquid crystal molecule in the cholesteric alignment region, $n_o$ is an ordinary refractive index of the liquid crystal molecule in the cholesteric alignment region, and $\theta(x)$ is an angle of an optical axis of the liquid crystal molecule at a corresponding coordinate with respect to an optical axis of the liquid crystal molecule at the point at which x is 0.

Here, as shown in FIG. 1, x is a coordinate of the cholesteric alignment region in a direction parallel to a surface of the lens layer, which has a value of 0 to P/2. The "0" is a coordinate at a point from which a pitch of the cholesterically-aligned liquid crystal molecule starts, as shown in FIG. 1. In one example, the point from which the pitch starts may be a point at which the major axis of the liquid crystal molecule is formed parallel to the surface of the lens layer. P/2 is a coordinate at a point at which the cholesterically-aligned liquid crystal molecule is rotated 180 degrees.

Here, $\theta(x)$ is an angle of an optical axis of the liquid crystal molecule at a corresponding coordinate (x) with respect to an optical axis of the liquid crystal molecule at the point at which x is 0, and thus $\theta(0)$ is 0. In addition, since an optical axis of the liquid crystal molecule at the point at which x is P/4 is rotated 90 degrees from the optical axis of the liquid crystal molecule at the point at which x is 0, $\theta(P/4)$ is $\pi/2$. In addition, since the optical axis of the liquid crystal molecule at the point at which x is P/2 is rotated 180 degrees from the optical axis of the liquid crystal molecule at the point at which x is 0, $\theta(P/2)$ is $\pi$.

When $\theta(0)=0$, $\theta(P/4)=\pi/2$, and $\theta(P/2)=\pi$ are adjusted to Equation 1, values of $n_{\textit{eff}}(0) = n_{\textit{eff}}(P/2) = n_o$ and $n_{\textit{eff}}(P/4) = n_e$ may be obtained. That is, the cholesteric alignment region may have refractive index distribution in which ordinary refractive indexes are obtained at 0 pitch and a ½ pitch (P/2), and an extraordinary refractive index is obtained at P/4.

The "$n_{\mathit{eff}}(x)$" may be a refractive index measured at an x position with respect to linearly-polarized light, for example, having a wavelength of 550 nm and perpendicular to a helical axis of the region.

When the refractive index distribution of cholesteric alignment region at the ½ pitch is controlled according to Equation 1, the lens layer may serve as a lenticular lens. Accordingly, as a liquid crystal lens is applied to, for example, an auto stereo-scopic 3D device, an image signal for a left eye and an image signal for a right eye may be split before emission.

In one example, the lens layer may serve as a lens having a focal point distance (F) determined by Equation 2 of 0.1 to 100, 0.1 to 70, 0.1 to 50, 0.1 to 30, or 0.1 to 10 cm.

$$F=P^2/(32 \times d \times \Delta n) \quad \text{[Equation 2]}$$

In Equation 2, P is a pitch of the cholesteric alignment region, d is a thickness of the lens layer, Δn is a difference ($n_e - n_o$) between an extraordinary refractive index ($n_e$) and an ordinary refractive index ($n_o$) of the liquid crystal molecule in the cholesteric alignment region.

The liquid crystal lens is a lens capable of exhibiting optical anisotropy and optical isotropy depending on a polarization state of light, which may be applied to, for example, an auto stereo-scopic 3D device displaying a 2D image and a 3D image.

The focal point distance (F) may be a focal point distance with respect to, for example, linearly-polarized light perpendicular to the helical axis of the region. Such a focal point distance may be controlled, for example, in consideration of a watching distance of a 3D device. In addition, to control the focal point distance (F), a pitch or double refractive index of the cholesteric alignment region, or a thickness of the lens layer may be controlled.

The pitch of the cholesteric alignment region may be suitably controlled in consideration of a pixel size of a display element of a 3D device. In one example, the pitch of the cholesteric alignment region may be controlled to be approximately 0.1 μm to 10 cm, 0.1 μm to 5 cm, 0.1 μm to 3 cm, 0.1 μm to 1 cm, 0.1 μm to 5000 μm, or 0.1 μm to 3000 μm. When the pitch is controlled in the above range, image signals for right and left eyes delivered from the display element may be split through the liquid crystal lens before emission.

In addition, to provide an auto stereo-scopic 3D device for watching a 3D image at a suitable distance without glasses, the difference ($n_e - n_o$) between an extraordinary refractive index ($n_e$) and an ordinary refractive index ($n_o$) of the liquid crystal molecule in the cholesteric alignment region may be controlled in a range from 0.01 to 0.6, 0.1 to 0.6 or 0.01 to 0.5. In addition, to ensure a suitable watching distance of the auto stereo-scopic 3D device, the thickness of the lens layer may be controlled to be 0.1 to 100 μm, 0.1 to 50 μm, 0.1 to 30 μm, or 0.1 to 10 μm.

The liquid crystal lens may further include a base layer. Moreover, the lens layer may be formed on one surface of the base layer.

As the base layer, a base layer conventionally used for a liquid crystal lens or for manufacturing a liquid crystal lens may be used without limitation. As the base layer, for example, a glass base layer or a plastic base layer may be used. The plastic base layer may be a sheet or film including: for example, a cellulose resin such as triacetyl cellulose (TAC) or diacetyl cellulose (DAC); a cyclic olefin polymer (COP) such as a norbornene derivative; a cyclic olefin copolymer (COC); an acryl resin such as poly(methyl methacrylate) (PMMA); polycarbonate (PC); polyolefin such as polyethylene (PE) or polypropylene (PP); polyvinyl alcohol (PVA); poly ether sulfone (PES); polyetheretherketone (PEEK); polyetherimide (PEI); polyethylenenaphthalate (PEN); polyester such as polyethyleneterephthalate (PET); polyimide (PI); polysulfone (PSF); or a fluorine resin. The plastic base layer may be optically isotropic or anisotropic.

The base layer may include a UV blocking agent or a UV absorbent. When the UV blocking agent or absorbent is included in the base layer, deterioration of the lens layer due to a UV ray may be prevented. The UV blocking agent or absorbent may be an organic material such as a salicylic acid ester compound, a benzophenone compound, an oxybenzophenone compound, a benzotriazol compound, a cyanoacrylate compound, or a benzoate compound, or an inorganic material such as a zinc oxide or a nickel complex salt. A content of the UV blocking agent or absorbent in the base layer is not particularly limited and may be suitably selected in consideration of a desired effect. For example, in the manufacturing process for the plastic base layer, the UV blocking agent or absorbent may be included in a weight ratio of approximately 0.1 to 25 wt % with respect to a weight ratio of a main component of the base layer.

A thickness of the base layer is not particularly limited, and may be suitably controlled according to a desired use. The base layer may have a monolayered or multilayered structure.

The liquid crystal lens may further include an alignment layer between the base layer and the lens layer to align the liquid crystal molecule. As the alignment layer, a conventional alignment layer known in the art, for example, a photo-alignment layer, a (nano) imprinting-type alignment layer, or a rubbing alignment layer may be used. The alignment layer is an optional component, which may provide an aligning property to the base layer without an alignment layer by directly rubbing it on the base layer or stretching the base layer.

In one example, when the cholesteric alignment region is a homeotropic alignment region, the alignment layer may be a vertical alignment layer. The vertical alignment layer may be an alignment layer capable of providing an aligning property to align an adjacent liquid crystal molecule in a direction vertical to a surface of the vertical alignment layer.

The liquid crystal lens may be formed by a method known in the related art to satisfy the above-described condition. In the liquid crystal lens, the cholesteric alignment region may be manufactured by forming, for example, a cholesterically-aligned liquid crystal layer from a cholesterically-aligned liquid crystal composition on one surface of the base layer.

The surface of the base layer on which the cholesteric alignment region will be formed may be, for example, a surface having hydrophilicity. The surface of the base layer having hydrophilicity may have a wetting angle of for example, 0 to 50, 0 to 40, 0 to 30, 0 to 20, or 0 to 10 degrees.

The wetting angle of the surface of the base layer may be a wetting angle with respect to water. Here, a method of measuring the wetting angle with respect to water of the base layer is not particularly limited and may be a method of measuring a wetting angle known in the related art using, for example, a DSA100 apparatus produced by KRUSS according to a manual of the manufacturer.

As the base layer having such a wetting angle, a base layer whose surface is treated by hydrophilization or a base layer including a hydrophilic functional group and thus having hydrophilicity from the beginning may be used.

Here, the hydrophilization treatment may be corona treatment, plasma treatment, or alkali treatment. The treatment condition is not particularly limited. In the related art, various methods for providing hydrophilicity to the base layer are known, and the base layer may be subjected to the hydrophilization to have the wetting angle by employing the above method.

When the cholesterically-aligned liquid crystal layer is formed on the base layer having the above-range of a wetting angle, the cholesterically-aligned liquid crystal layer may be aligned without the alignment layer or a helical axis of the aligned cholesteric alignment region may be controlled in a desired range. However, as necessary, the above-described alignment layer may be formed on a surface of the base layer on which the cholesterically-aligned liquid crystal layer is formed.

As the cholesterically-aligned liquid crystal composition is applied to the surface of the base layer having the wetting angle, the cholesterically-aligned liquid crystal layer may be formed. Here, the term "cholesterically-aligned liquid crystal composition" may include all kinds of compositions which may be used to form the cholesteric alignment region.

In one example, the composition may include nematic liquid crystal molecules and a chiral agent. The nematic liquid crystal molecules are usually aligned in a long axis direction in a state in which the molecules are aligned at irregular positions without forming a layer. As the chiral agent is added to the nematic liquid crystal molecules, a desired helical pitch may be induced. Here, the helical pitch may be controlled according to Equation 3.

$$P = 1/P_t \cdot c$$ [Equation 3]

In Equation 3, $P_t$ is a twisting power of the chiral agent, and c is a mole concentration of the chiral agent. Accordingly, when a chiral agent having a high twisting power is used or a content of a chiral agent is increased, a pitch of a chiral nematic liquid crystal molecule may become shorter.

The nematic liquid crystal molecule may be any one used in the related art without limitation. For example, as the liquid crystal molecule, a compound represented by Formula 1 may be used.

[Formula 1]

In Formula 1, A is a single bond, —COO—, or —OCO—, each of $R_1$ to $R_{10}$ is independently hydrogen, a halogen, an alkyl group, an alkoxy group, an alkoxycarbonyl group, a cyano group, a nitro group, —U-Q-P, or a substituent of Formula 2, or a pair of two adjacent substituents of $R_1$ to $R_5$ or a pair of two adjacent substituents of $R_6$ to $R_{10}$ are linked to each other, thereby forming a benzene substituted with —U-Q-P, but at least one of $R_1$ to $R_{10}$ is —U-Q-P or the substituent of Formula 2, at least one of the pair of two adjacent substituents of $R_1$ to $R_5$ and the pair of two adjacent substituents of $R_6$ to $R_{10}$ are linked to each other, thereby forming the benzene substituted with —U-Q-P. Here, U is —O—, —COO—, or —OCO—, Q is an alkylene group or an alkylidene group, P is an alkenyl group, an epoxy group, a cyano group, a carboxyl group, an acryloyl group, a methacryloyl group, an acryloyloxy group, or a methacryloyloxy group.

[Formula 2]

In Formula 2, B is a single bond, —COO—, or —OCO—, each of $R_{11}$ to $R_{15}$ is independently hydrogen, a halogen, an alkyl group, an alkoxy group, an alkoxycarbonyl group, a cyano group, a nitro group, or —U-Q-P, or two adjacent substituents of $R_{11}$ to $R_{15}$ are linked to each other, thereby forming a benzene substituted with —U-Q-P, but at least one of $R_{11}$ to $R_{15}$ is —U-Q-P, or at least a pair of two adjacent substituents of $R_{11}$ to $R_{15}$ are linked to each other, thereby forming the benzene substituted with —U-Q-P. Here, U is —O—, —COO—, or —OCO—, Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

In Formulas 1 and 2, the sentence "two adjacent substituents are linked to each other, thereby forming a benzene substituted with —U-Q-P" may refer that the two adjacent substituents are linked to each other, thereby forming a naphthalene backbone overall substituted with —U-Q-P.

In Formula 2, the mark on the left of B may refer that B is directly linked to a benzene of Formula 1.

In Formulas 1 and 2, the term "single bond" refers that there is no separate atom at a part represented as A or B. For example, in Formula 1, when A is a single bond, benzenes at both ends of A may be directly linked, thereby forming a biphenyl structure.

In Formulas 1 and 2, as a halogen, fluorine, chlorine, bromine or iodine may be used.

The term "alkyl group" used herein may be, unless specifically defined otherwise, a linear or branched alkyl group having 1 to 20, 1 to 16, 1 to 12, 1 to 8, or 1 to 4 carbon atoms, or a cycloalkyl group having 3 to 20, 3 to 16, or 4 to 12 carbon atoms. The alkyl group may be optionally substituted with at least one substituent.

The term "alkoxy group" used herein may be, unless specifically defined otherwise, an alkoxy group having 1 to 20, 1 to 16, 1 to 12, 1 to 8, or 1 to 4 carbon atoms. The alkoxy group may be a linear, branched, or cyclic type. In addition, the alkoxy group may be optionally substituted with at least one substituent.

In addition, the term "alkylene or alkylidene group" used herein may be, unless specifically defined otherwise, an alkylene or alkylidene group having 1 to 12, 4 to 10, or 6 to 9 carbon atoms. The alkylene or alkylidene group may be a linear, branched, or cyclic type. In addition, the alkylene or alkylidene group may be optionally substituted with at least one substituent.

In addition, the term "alkenyl group" used herein may be, unless specifically defined otherwise, an alkenyl group having 2 to 20, 2 to 16, 2 to 12, 2 to 8, or 2 to 4 carbon atoms. The alkenyl group may be a linear, branched, or cyclic type. In addition, the alkenyl group may be optionally substituted with at least one substituent.

In one example, in Formulas 1 and 2, P may be an acryloyl group, a methacryloyl group, an acryloyloxy group, or a methacryloyloxy group.

In Formulas 1 and 2, at least one, for example, one or two —U-Q-Ps or moieties of Formula 2 may be present at, for example, a position of $R_1$, $R_8$, or $R_{13}$. In addition, in the compound of Formula 1 or the moiety of Formula 2, a substituent, other than the —U-Q-P or the moiety of Formula 2, may be, for example, hydrogen, a halogen, a linear or branched alkyl group having 1 to 4 carbon atoms, a cycloalkyl group having 4 to 12 carbon atoms, a cyano group, an alkoxy group having 1 to 4 carbon atoms or a nitro group. In another example, a substituent other than the —U-Q-P or the moiety of Formula 2 may be chlorine, a linear or branched alkyl group having 1 to 4 carbon atoms, a cycloalkyl group having 4 to 12 carbon atoms, an alkoxy group having 1 to 4 carbon atoms or a cyano group.

In the specification, a substituent which may be substituted to a specific compound or functional group may be, but is not limited to, an alkyl group, an alkoxy group, an alkenyl group, an epoxy group, an oxo group, an oxetanyl group, a mercapto group, a cyano group, a carboxyl group, an acryloyl group, a methacryloyl group, an acryloyloxy group, a methacryloyloxy group, or an aryl group.

Here, as a chiral agent, any one capable of inducing a desired helical pitch without damaging to crystallinity of the liquid crystal, for example, nematic regularity may be used without particular limitation. The chiral agent for inducing the helical pitch to the liquid crystal is necessary to include at least chirality in a molecular structure. As the chiral agent, for example, a compound having one or at least two asymmetric carbons, a compound having an asymmetric point on a hetero atom such as a chiral amine or chiral sulfoxide, or a compound having an axially asymmetric and optically active site having an axial member such as cumulene or binaphthol may be used. The chiral agent may be, for example, a low molecular compound having a molecular weight of 1,500 or less. For example, as the chiral agent, a commercially-available chiral nematic liquid crystal, for example, a chiral dopant liquid crystal such as S-811 available from Merck or LC756 available from BASF may be used.

The chiral agent may be used in a ratio of 1 to 10 parts by weight with respect to 100 parts by weight of the compound of Formula 1. As the content of the chiral agent is controlled as described above, helical twisting of the cholesteric alignment region may be effectively induced. Unless specifically defined otherwise in the specification, the unit "parts by weight" may refer to a weight ratio.

In addition, the composition may further include an initiator or crosslinking agent for polymerizing or crosslinking the compound represented by Formula 1. A suitable polymerization initiator may include any one capable of generating free radicals to initiate and propagate polymerization or crosslinking. A free radical initiator may be selected according to, for example, stability or a half-life. As such a free radical initiator, any one capable of not expressing an additional color in the cholesteric alignment region by absorption or a different method may be used. The free radical initiator may be typically a thermal free radical initiator or a photoinitiator. The thermal free radical initiator may include, for example, a peroxide, persulfate, or azonitrile compound. The free radical initiator generates a free radical during thermal decomposition.

A photoinitiator may be activated by radiation of an electromagnetic radiant ray or particle. Examples of suitable photoinitiators may include an onium salt photoinitiator, an organic metal photoinitiator, a cationic metal salt photoinitiator, a photo-degradable organic silane, latent sulfonic acid, phosphine oxide, cyclohexyl phenylketone, amine-substituted acetophenone, and benzophenone. Generally, other light sources may be used, but UV radiation may be used to activate the photoinitiator. The photoinitiator may be selected by absorbing a specific wavelength of light.

The liquid crystal composition may include an initiator at 0.1 to 10 parts by weight with respect to 100 parts by weight of the compound of Formula 1. As the content of the initiator is controlled as described, effective polymerization and crosslinking of the liquid crystal molecule may be induced, and after polymerization and crosslinking, a decrease in physical properties by a remaining initiator may be prevented.

The cholesterically-aligned liquid crystal composition may be typically a part of a coating composition including at least one solvent. Examples of the solvents may include, for example, halogenated hydrocarbons including chloroform, dichloromethane, tetrachloroethane, trichloroethylene, tetrachloroethylene, and chlorobenzene; aromatic hydrocarbons including benzene, toluene, xylene, methoxy benzene, and 1,2-dimethoxybenzene; alcohols including methanol, ethanol, propanol, and isopropanol; ketones including acetone, methylethylketone, methylisobutylketone, cyclohexanone, and cyclopentanone; cellosolves including methylcellosolve, ethylcellosolve, and butylcellosolve; and ethers including diethyleneglycol dimethylether (DEGDME) and dipropyleneglycol dimethylether (DPGDME). In addition, the content of the solvent is not particularly limited, and may be suitably selected in consideration of coating efficiency or drying efficiency.

In addition, the liquid crystal composition may further include a surfactant. The surfactant may be distributed on a surface of the liquid crystal to make the surface even, stabilize liquid crystal alignment to smoothly maintain a surface of the cholesterically-aligned liquid crystal layer after formation, and thus enhance an exterior quality.

As the surfactant, for example, a fluorocarbon-based surfactant and/or a silicon-based surfactant may be used. As the fluorocarbon-based surfactant, a product produced by 3M such as Fluorad FC4430™, Fluorad FC4432™, or Fluorad FC4434™, or a product produced by DuPont such as Zonyl may be used, and as a silicon-based surfactant, a product produced by BYK-Chemie such as BYK™ may be used. A content of the surfactant is not particularly limited, and may be suitably selected in consideration of coating efficiency or drying efficiency.

In the liquid crystal composition or a coating composition including the same, in addition to the above-described components, a polymerizable monomer, a polymer, a dispersing agent, an antioxidant, or an ozone inhibitor may be further blended without interfering alignment of the liquid crystal molecule. In addition, the coating composition may include various dyes and pigments to absorb UV rays, IR rays, or visible rays if wanted. In some cases, it may be preferable that tackifiers such as a thickening agent and a filler are included.

The cholesterically-aligned liquid crystal composition may be applied to the base layer by, for example, various liquid coating methods. In some aspects, after coating, the cholesterically-aligned liquid crystal composition is crosslined, polymerized, or converted into a cholesterically-aligned liquid crystal layer. Such conversion may be performed by various techniques including: evaporation of a solvent and/or heating for aligning a liquid crystal molecule; crosslinking or polymerization of the cholesterically-aligned liquid crystal composition; application of heat such as actinic radiation; radiation of light such as a UV ray, a visible ray, or an IR ray and an electron beam; a combination thereof; and curing of the cholesterically-aligned liquid crystal composition using a similar technique.

In the manufacturing method, an operation of coating the cholesterically-aligned liquid crystal composition and forming the cholesterically-aligned liquid crystal layer may include, for example, an operation of curing a coating layer of the liquid crystal composition.

The liquid crystal layer may be formed by radiating a sufficient amount of UV ray to polymerize components of the composition. Conditions for radiating the UV ray are not particularly limited as long as polymerization of the components of the composition is sufficiently performed. In one example, the radiation of a UV ray may be performed by radiating a UV ray in a region A or C at an intensity of radiation of approximately 1 to 10 J/cm$^2$.

The liquid crystal lens may be manufactured using a method used in the related art, other than the above-described methods, without limitation.

Another aspect of the present application provides an optical filter including a polarization control element and a liquid crystal lens disposed such that light emitted from the polarization control element is incident. The liquid crystal lens may be, for example, the above-described liquid crystal lens.

When light is incident on the polarization control element, a polarization direction of the light may be controlled. As the polarization control element, for example, a transparent liquid crystal panel may be used. In one example, the transparent liquid crystal panel capable of being used as the polarization control element may sequentially include a lower substrate, a lower electrode, a lower alignment layer, a liquid crystal layer, an upper alignment layer, an upper electrode, and an upper substrate. As the upper and lower electrodes, for example, a transparent conductive electrode such as indium tin oxide (ITO) may be used. In addition, the upper and lower alignment layers may include, for example, a material such as polyimide. The liquid crystal layer may include, for example, a vertical alignment (VA), twisted nematic (TN), super twisted nematic (STN), or in-plane switching (IPS)-mode liquid crystal. The liquid crystal layer may serve to control the polarization direction of the incident light due to a voltage applied from a drive circuit.

Figure 2:
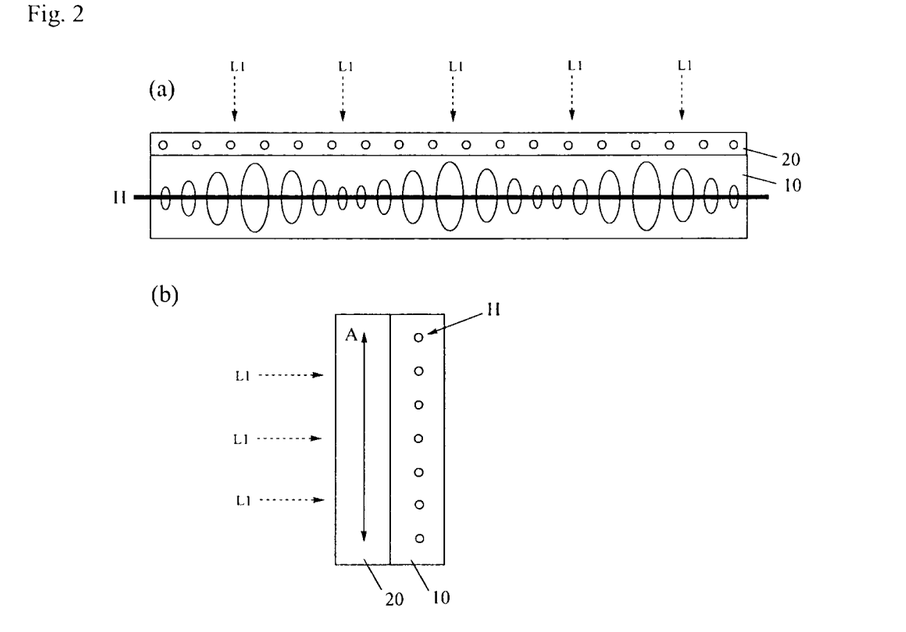
FIG. 2 shows schematic diagrams of (a) a cross-section of an upper side of an exemplary optical filter, and (b) a cross-section of a side surface of the optical filter when, in the exemplary optical filter, a polarization control element controls a state of polarizing light to be perpendicular to a helical axis of a liquid crystal lens.

In one example, as shown in FIG. 2, linearly-polarized light (L1) may be transmitted through a polarization control element 20. Here, the polarization control element 20 may control a polarization direction A of the linearly-polarized light transmitted through the element to be perpendicular to a helical axis H of a liquid crystal lens 10. The polarization direction A of the light is represented as o in FIG. 2(a), and as ↕ in FIG. 2(b). That is, the "o" represents the case that the polarization direction of the light is a direction of going out of or into a plane, and the "↕" represents the case that the polarization direction of the light is parallel to the plane.

The linearly-polarized light delivered from the polarization control element 20 is polarized in a direction perpendicular to the helical axis of the liquid crystal lens, and thus influenced by optical anisotropy of the liquid crystal lens. In one example, the linearly-polarized light delivered from the polarization control element may be split according to positions to be incident on the liquid crystal lens before emission.

Figure 3:
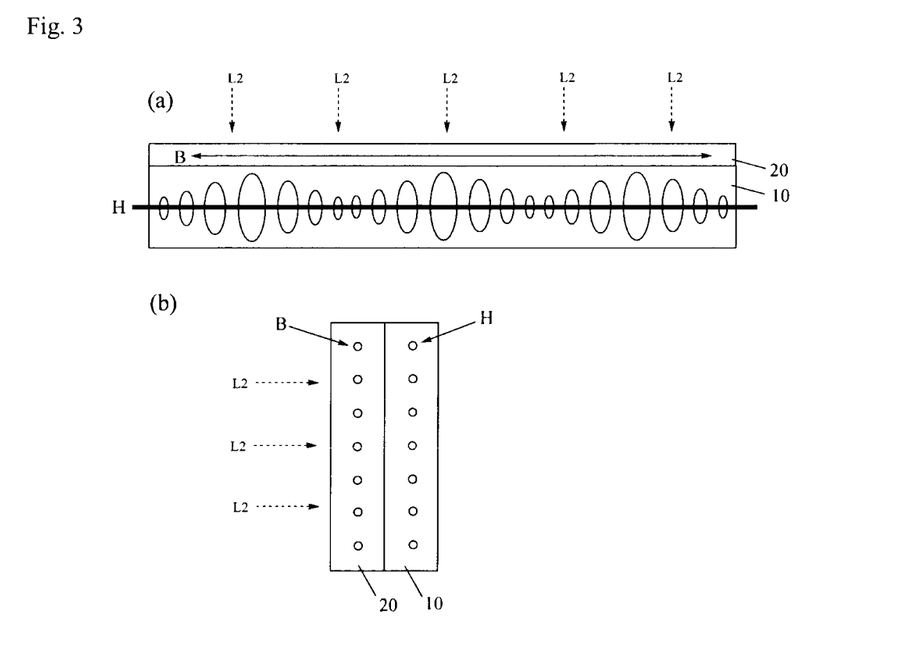
FIG. 3 shows schematic diagrams of (a) a cross-section of an upper side of an exemplary optical filter, and (b) a cross-section of a side surface of the optical filter when, in the exemplary optical filter, a polarization control element controls a state of polarizing light to be parallel to a helical axis of a liquid crystal lens.

In another example, as shown in FIG. 3, linearly-polarized light (L2) may be transmitted through the polarization control element 20. Here, the polarization control element 20 may control a polarization direction B of the linearly-polarized light transmitted through the panel to be parallel to the helical axis H of the liquid crystal lens 10. The linearly-polarized light delivered from the polarization control element 20 may be polarized in a direction parallel to the helical axis of the liquid crystal lens, and thus not be influenced by optical anisotropy of the liquid crystal lens. As a result, the linearly-polarized light delivered from the polarization control element is entirely transmitted through the liquid crystal lens regardless of the incident positions on the liquid crystal lens.

Still another aspect of the present application provides a display device including a liquid crystal lens. The liquid crystal lens may be, for example, the above-described liquid crystal lens. In addition, the display device including the liquid crystal lens may be, for example, an auto stereo-scopic 3D device.

Figure 4:
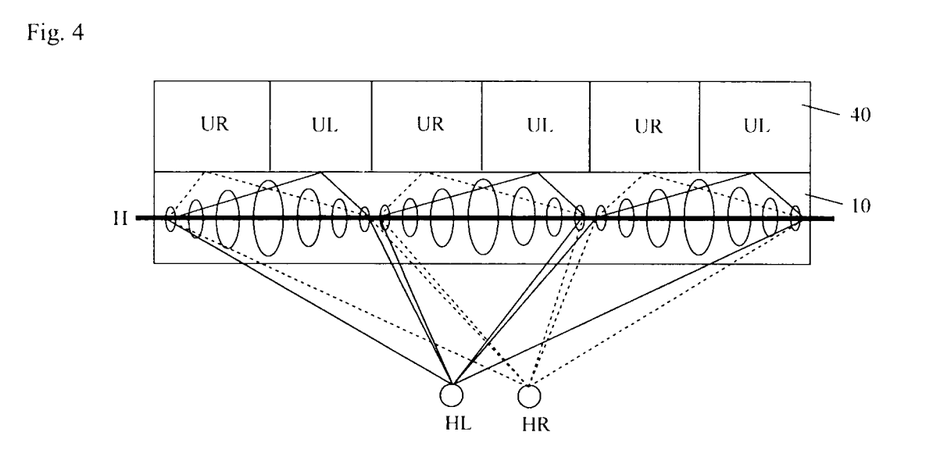
FIG. 4 is a schematic diagram showing a driving state of an exemplary auto stereo-scopic 3D device to project a 3D image.

The device may include, as shown in FIG. 4, a display element 40 and a liquid crystal lens 10. In addition, the device may further include a polarizer between the display element and the liquid crystal lens. In addition, the device may further include a polarizer and a light source, which are sequentially disposed on an opposite side of an optical filter of the display element. Hereinafter, in the specification, for convenience of description, the polarizer disposed between the light source and the display element refers to a first polarizer, and the polarizer disposed on an opposite side of the first polarizer refers to a second polarizer.

The first and second polarizers included in the device are optical elements having a transmission axis and an absorption axis perpendicular to the transmission axis. When light is incident on the polarizer, the polarizer may transmit only light having a polarization axis parallel to the transmission axis of the polarizer among incident lights.

In one example, the absorption axis of the first polarizer and the absorption axis of the second polarizer included in the device may be perpendicular to each other. In this case, the transmission axes of the first and second polarizers may also be perpendicular to each other.

As a light source, a direct or edge-type back light unit (BLU) conventionally used in a liquid crystal display (LCD) may be used. Other than that, various kinds of light sources may be used without limitation.

The display element of the device may generate image signals in a driving state, for example, image signals including an image signal (hereinafter, referred to as "R signal") for a right eye and an image signal (hereinafter, referred to as "L signal") for a left eye. In one example, the display element may include a region (hereinafter, referred to as "UR region") of generating the R signal capable of generating the R signal, and a region (hereinafter, referred to as "UL region") of generating the L signal capable of generating the L signal in a driving state. However, in the display element, the regions of generating image signals are referred to as the UR and UL regions, but as will be described below, the display element may generate a 2D image signal regardless of a name of the region.

The display element may be, for example, a region including a transparent liquid crystal panel or a region formed by a liquid crystal layer of the liquid crystal panel. The transparent liquid crystal panel may include, for example, a first substrate, a pixel electrode, a first alignment layer, a liquid crystal layer, a second alignment layer, a common electrode, and a second substrate, which are sequentially disposed from the side of the light source. For example, an active drive circuit including a thin film transistor (TFT) and an interconnection may be formed on the first substrate on the side of the light source as a drive element electrically connected to a transparent pixel electrode. The pixel electrode may include, for example, ITO, and serve as an electrode by pixels. In addition, the first or second alignment layer may include, for example, a material such as polyimide. The liquid crystal layer may include, for example, a VA, TN, STN, or IPS-mode liquid crystal. The liquid crystal layer may serve to transmit or block light emitted from the light source by pixels due to a voltage applied from the drive circuit. The common electrode may include, for example, ITO, and serve as a common counter electrode.

The display element may include UR & UL regions formed by at least one pixel. For example, in the liquid crystal panel, the UR or UL region may be formed using a unit pixel including a liquid crystal sealed between the first and second alignment layers or a combination of at least two unit pixels.

Figure 5:
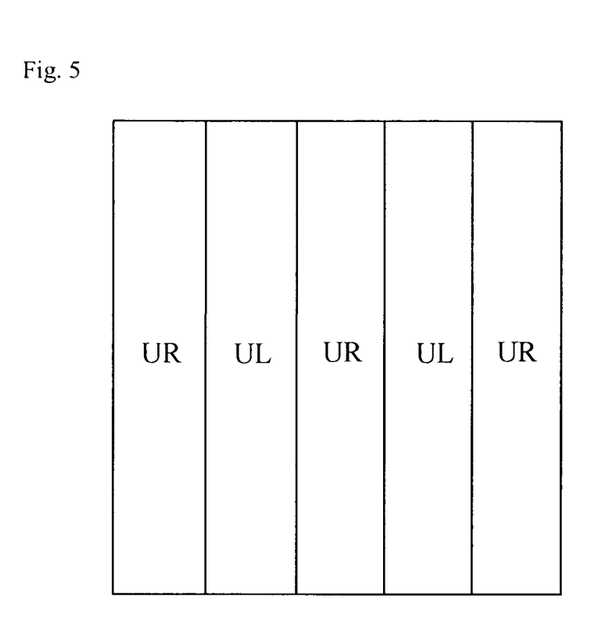
FIGS. 5 and 6 are diagrams showing exemplary arrangements of UR and UL regions.
Figure 6:
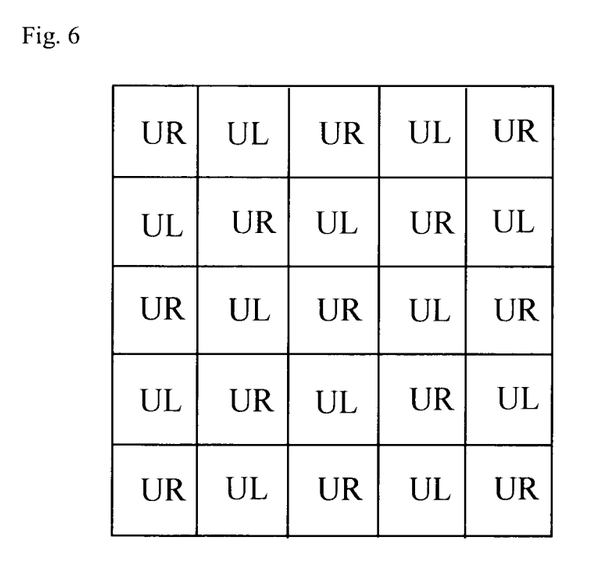

The UR and UL regions may be disposed in a column and/or row direction(s). FIG. 5 is a diagram showing exemplary arrangement of the UR and UL regions. As shown in FIG. 5, the UR and UL regions may have a stripe shape extending in a common direction, and may be adjacently and alternately arranged. FIG. 6 shows another exemplary arrangement, in which UR and UL regions are arranged adjacently and alternately in a lattice pattern. The arrangement of the UR and UL regions is not limited to the arrangements shown in FIGS. 5 and 6, and thus all of various designs known in the related art may be applied.

The display element may generate image signals including R and L signals by driving pixels in each region according to a signal in a driving state.

As an example, an operation in which the display element generates image signals including R and L signals in the device will be explained. For example, when light emitted from the light source is incident on a first polarizer, only light polarized parallel to a transmission axis of the first polarizer is transmitted through the first polarizer. After the transmitted light is incident on the display element, the light transmitted through an UR region may become an R signal, and the light transmitted through an UL region may become an L signal. When the R and L signals are incident on a second polarizer, only a signal polarized parallel to a transmission axis of the second polarizer may be incident on a liquid crystal lens through the second polarizer. In one example, the polarized signal incident on the liquid crystal lens through the second polarizer may be a linearly-polarized signal. In addition, the linearly-polarized signal may be polarized in a direction perpendicular to a helical axis of the liquid crystal lens and then incident on the liquid crystal lens.

The liquid crystal lens may include, as described above, a cholesteric alignment region, which is a homeotropic alignment region.

As described in FIG. 4, the liquid crystal lens 10 may be arranged to transmit light delivered from the display element 40. In addition, as shown in FIG. 4, the liquid crystal lens may be arranged such that a ½ pitch of the cholesteric alignment region thereof corresponds to that of a pair of UR and UL regions of the display element. The arrangement to correspond the ½ pitch of the cholesteric alignment region to that of the pair of the UR and UL regions refers to arrangement of image signals generated in the pair of the UR and UL regions to be incident in a ½ pitch of the cholesterically-aligned liquid crystal region, not necessarily refer that ½ pitches of the pair of the UR and UL regions and the cholesterically-aligned liquid crystal region are formed at the same position in the same size.

An operation of driving a device including the liquid crystal lens to project a 3D image will be explained. As shown in FIG. 4, when the device projects a 3D image, the display element 40 may generate an R signal in the UR region and an L signal in the UL region. The R and L signals generated in the display element 40 may be incident on the liquid crystal lens 10. Here, the R and L signals emitted from the display element 40 may be emitted by controlling a polarization direction to be perpendicular to a helical axis H of the liquid crystal lens 10. The R and L signals polarized perpendicular to the helical axis may be split due to the influence of optical anisotropy of the liquid crystal lens and then emitted in different directions. In one example, as shown in FIG. 4, the R signal generated in the UR region and the L signal generated in the UL region may be spit through a cholesteric alignment region. In addition, the R signal transmitted through the liquid crystal region may be incident on a right eye (HR) of an observer, and the L signal transmitted through the liquid crystal region may be incident on a left eye (HL) of the observer. Accordingly, the observer may observe a 3D image without wearing special glasses, for example, shutter glass-type glasses or polarizing glasses.

Figure 7:
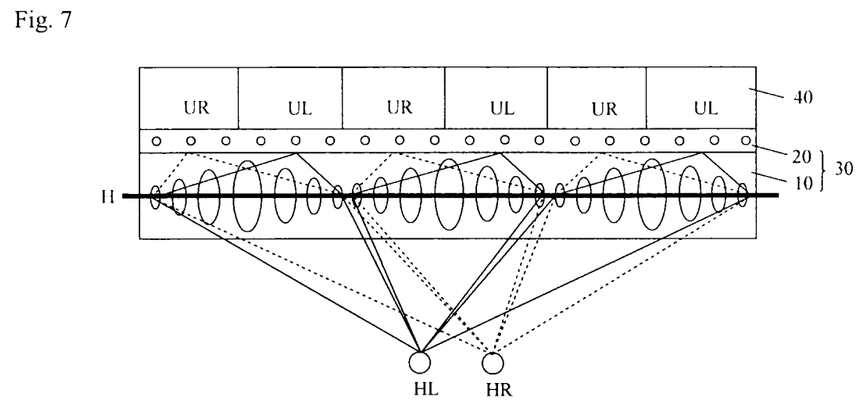
FIG. 7 is a schematic diagram showing a driving state of an exemplary display device for displaying 2D and 3D images to project a 3D image.
Figure 8:
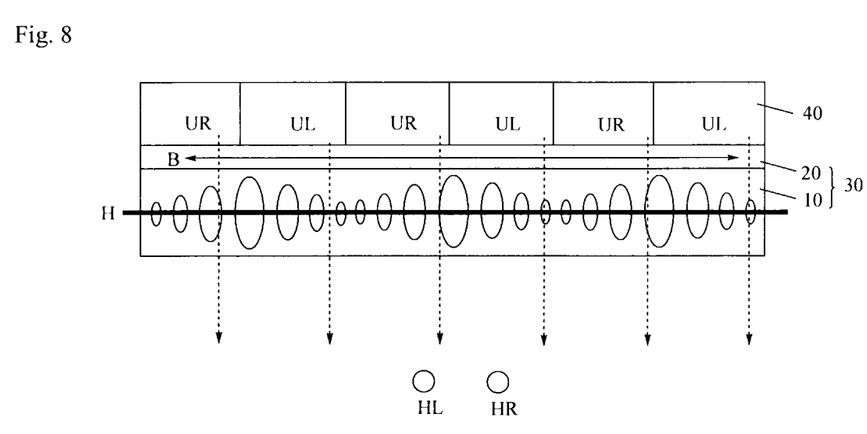
FIG. 8 is a schematic diagram showing a driving state of an exemplary display device for displaying 2D and 3D images to project a 2D image.

The display device may further include a polarization control element. As shown in FIGS. 7 and 8, the polarization control element 20 may be arranged between a display element 40 and a liquid crystal lens 10. Accordingly, the polarization control element may be emitted in a direction of the liquid crystal lens by controlling a polarization direction of an image signal emitted from the display element.

The display device may include a polarization control element to display a 2D image and a 3D image.

The polarization control element may be arranged, for example, between the second polarizer and the liquid crystal lens. In addition, when the polarization control element is included, as the display element, for example, a display element capable of generating a 2D image signal or an image signal including R and L signals in a driving state. Such a display element may generate the 2D image signal or the image signal including the R and L signals by driving pixels in each region according to a signal in the driving state.

In one example, an operation in which the display element generates the image signal including R and L signals in the device including the polarization control element will be explained. For example, when light emitted from the light source is incident on the first polarizer, only light polarized parallel to the transmission axis of the first polarizer is transmitted through the first polarizer. After the transmitted light is incident on the display element, the light transmitted through the UR region may become an R signal, and the light emitted through the UL region may become an L signal. When the R and L signals are incident to the second polarizer, only a signal polarized parallel to the transmission axis of the second polarizer may be transmitted through the second polarizer, and then incident on an optical filter.

In another example, an operation in which a display element generates a 2D image signal in a device including the polarization control element will be explained. For example, when light emitted from the light source is incident on the first polarizer, only light polarized parallel to the transmission axis of the first polarizer is transmitted through the first polarizer. After the transmitted light is incident on the display element and generates a 2D image signal, both of the light transmitted through an UR region and the light emitted through an UL region may become the same 2D image signals. When the generated 2D image signals are incident to the second polarizer, only a signal polarized parallel to the transmission axis of the second polarizer may be transmitted through the second polarizer, and then incident on an optical filter.

According to the control of a polarization direction of light by the polarization control element of the optical filter, it is determined whether light transmitted through the polarization control element is influenced by optical anisotropy of the liquid crystal lens. Accordingly, the device may project a 2D image or a 3D image.

An operation in which a device equipped with the optical filter is driven to project a 3D image will be explained. As shown in FIG. 7, in the state in which the device projects a 3D image, the display element 40 may generate an R signal in the UR region, and an L signal in the UL region. The R and L signals generated in the display element 40 may be incident on the polarization control element 20. The polarization control element 20 may control directions of polarizing the R and L signals to be perpendicular to the helical axis H of the liquid crystal lens 10. The R and L signals polarized perpendicular to the helical axis may be split due to the influence of the optical anisotropy of the liquid crystal lens and then emitted in different directions. In one example, as shown in FIG. 7, the R signal generated in the UR region and the L signal generated in the UL region may be split through a cholesterically-aligned liquid crystal region. In addition, the R signal transmitted through the liquid crystal region is incident to the right eye (HR) of the observer, and the L signal transmitted through the liquid crystal region is incident to the left eye (HL) of the observer. Accordingly, the observer may observe the 3D image without wearing special glasses, for example, shutter glass-type glasses or polarizing glasses.

An operation in which the device equipped with the optical filter is driven to project a 2D image will be explained. As shown in FIG. 8, in the state in which the 2D image is projected, the display element 40 may generate a 2D image signal. The 2D image signal generated in the display element 40 may be incident on the polarization control element 20. The polarization control element 20 may control a direction of polarizing the incident 2D image signal to be parallel to the helical axis H of the liquid crystal lens 10. The signal polarized in the direction parallel to the helical axis may be transmitted through the liquid crystal lens without an influence of optical anisotropy of the liquid crystal lens. In one example, as shown in FIG. 8, the 2D image signals generated in the UR and UL regions may be transmitted through a cholesterically-aligned liquid crystal region as they are. As a result, the observer may observe the 2D image.

The device may be realized by employing a configuration and a method, which are conventionally used in the related art, except that it may display a 2D image and a 3D image using the optical filter.

Technical Effects

An exemplary liquid crystal lens can exhibit optical anisotropy and optical isotropy according to a polarization state of incident light. When the liquid crystal lens is applied to a display device capable of generating a 2D image and a 3D image, the 3D image can be seen without glasses in the state of the optical anisotropy, and the 2D image can be seen in the state of the optical isotropy.

ILLUSTRATIVE EMBODIMENTS

Hereinafter, a liquid crystal lens, a polarization control element, and a display device will be described in detail with reference to Example and Comparative Example, but the lens, element, and device are not limited to the following Example.

Example (1) Manufacture of Liquid Crystal Lens and Optical Filter

As a cholesterically-aligned liquid crystal composition, a composition including a liquid crystal molecule having a difference ($n_e$–$n_o$) between an extraordinary refractive index ($n_e$) and an ordinary refractive index ($n_o$) of approximately 0.4 was used. A liquid crystal lens was manufactured using a base layer in which a vertical alignment layer, which was generally used to manufacture a liquid crystal film, was formed. Specifically, the liquid crystal lens was formed by coating the composition on the vertical alignment layer to form a layer having a thickness of approximately 4.78 μm, and polymerizing the layer in a cholesterically-aligned state. A pitch (P) of a cholesteric alignment region of the liquid crystal lens was approximately 300 μm.

In addition, an optical filter was manufactured by disposing the liquid crystal lens on one surface of a polarization control element prepared by a method generally used to manufacture a liquid crystal panel.

(2) Manufacture of Display Device

A display device was manufactured by applying the optical filter manufactured as described above to a conventional lenticular lens-type 3D device as a lenticular lens. Specifically, as shown in FIG. 7, the device was manufactured by arranging an optical filter 30 such that a polarization control element 20 is in contact with a surface of a display element 40, which emitted light.

Experimental Example

Whether an observer could see a 3D image without special glasses when, in the display device, the polarization control element controlled linearly-polarized light perpendicular to a helical axis of the liquid crystal lens to be incident on the liquid crystal lens, was evaluated by the following method.

Figure 9:
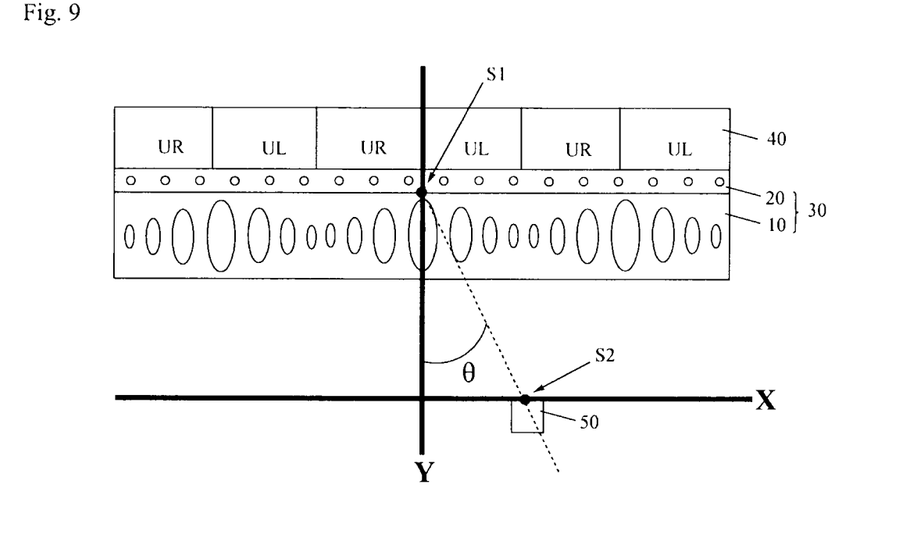
FIG. 9 is a diagram illustrating a method of evaluating whether a display device splits L and R signals before emission or not according to Example.

First, as shown in FIG. 9, a luminance meter (SR-UL2 Spectrometer, 50) was disposed at an observation point (an optional point in contact with an X line of FIG. 9) at which the display device could be observed. Subsequently, while the device was set to output an L signal, a luminance was measured using the luminance meter. A luminance in each case was measured while the luminance meter 50 was kept a distance away from the device and moved in a direction parallel to the X line of FIG. 9. In each case, a luminance was measured and then defined as an intensity of the L signal at each point. Likewise, a luminance was measured by moving the luminance meter while the device was set to output an R signal. In addition, the luminance was defined as an intensity of the R signal at the point.

Figure 10:
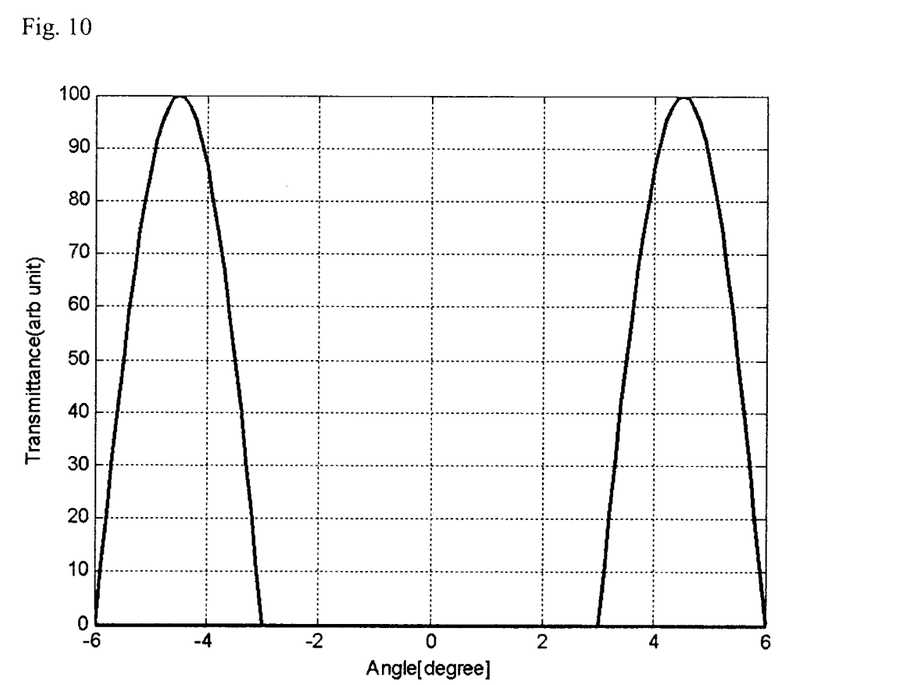
FIG. 10 is a graph showing that a display device splits L and R signals before emission according to Example.

The intensities of the L and R signals at each point are shown in Table 1 and FIG. 10.

In Table 1, a measurement angle (θ) was defined as an angle between a virtual line connecting a point S1 at which a Y line was in contact with a surface of the polarization control element to a point S2 of a center of the luminance meter and the Y line in FIG. 9. In addition, when the luminance meter was present on the right of the Y line, the measurement angle was defined as a positive value, and when the luminance meter was present on the left of the Y line, the measurement angle was defined as a negative value. Here, the Y line may be defined as a normal line with respect to a surface of the device, passing through the center of the device.

TABLE 1

| Measurement Angle (Unit: Degrees) | Intensity of L Signal [a] | Measurement Angle (Unit: Degrees) | Intensity of R Signal [b] |
|---|---|---|---|
| −6 | 0 | 3 | 0 |
| −5.9 | 10.4528 | 3.1 | 10.4528 |
| −5.8 | 20.7912 | 3.2 | 20.7912 |
| −5.7 | 30.9017 | 3.3 | 30.9017 |
| −5.6 | 40.6737 | 3.4 | 40.6737 |
| −5.5 | 50 | 3.5 | 50 |
| −5.4 | 58.7785 | 3.6 | 58.7785 |
| −5.3 | 66.9131 | 3.7 | 66.9131 |
| −5.2 | 74.3145 | 3.8 | 74.3145 |
| −5.1 | 80.9017 | 3.9 | 80.9017 |
| −5 | 86.6025 | 4 | 86.6025 |
| −4.9 | 91.3545 | 4.1 | 91.3545 |
| −4.8 | 95.1057 | 4.2 | 95.1057 |
| −4.7 | 97.8148 | 4.3 | 97.8148 |
| −4.6 | 99.4522 | 4.4 | 99.4522 |
| −4.5 | 100 | 4.5 | 100 |
| −4.4 | 99.4522 | 4.6 | 99.4522 |
| −4.3 | 97.8148 | 4.7 | 97.8148 |
| −4.2 | 95.1057 | 4.8 | 95.1057 |
| −4.1 | 91.3545 | 4.9 | 91.3545 |
| −4 | 86.6025 | 5 | 86.6025 |
| −3.9 | 80.9017 | 5.1 | 80.9017 |
| −3.8 | 74.3145 | 5.2 | 74.3145 |
| −3.7 | 66.9131 | 5.3 | 66.9131 |
| −3.6 | 58.7785 | 5.4 | 58.7785 |
| −3.5 | 50 | 5.5 | 50 |
| −3.4 | 40.6737 | 5.6 | 40.6737 |
| −3.3 | 30.9017 | 5.7 | 30.9017 |
| −3.2 | 20.7912 | 5.8 | 20.7912 |
| −3.1 | 10.4528 | 5.9 | 10.4528 |
| −3 | 0 | 6 | 0 |

[a, b]: The intensities of the L and R signals are relative intensities if the intensity of a signal at a point at which the maximum luminance is measured is set to 100.

What is claimed is:

1. A liquid crystal lens, comprising: a lens layer comprising a cholesteric alignment region comprising a cholesterically-aligned liquid crystal molecule,
   wherein the cholesteric alignment region is a homeotropically aligned region, and the lens layer has a focal distance (F) according to Equation 2 in the range from 0.1 mm to 10 cm:

$$F = P^2/(32 \times d \times \Delta n)$$ [Equation 2]

where P is a pitch of the cholesteric alignment region, d is a thickness of the lens layer, $\Delta n$ is a difference ($n_e - n_o$) between an extraordinary refractive index ($n_e$) and an ordinary refractive index ($n_o$) of the liquid crystal molecule in the cholesteric alignment region.

2. The liquid crystal lens according to claim 1, wherein the cholesteric alignment region has a refractive index distribution according to Equation 1 with respect to light that is linearly polarized so as to be perpendicular to a helical axis of the cholesteric alignment region:

$$n_{eff}(x) = n_e n_o / (n_e^2 \cos^2\theta(x) + n_o^2 \sin^2\theta(x))^{1/2}$$ [Equation 1]

where x is a coordinate of the cholesteric alignment region, which is an optional number between 0 to P/2, P is a pitch of the cholesteric alignment region, $n_{eff}(x)$ is a refractive index of the cholesteric alignment region with respect to the linearly-polarized light at an x point, $n_e$ is an extraordinary refractive index of the liquid crystal molecule, $n_o$ is an ordinary refractive index of the liquid crystal molecule, and $\theta(x)$ is an angle of an optical axis of the liquid crystal molecule at a corresponding coordinate with respect to an optical axis of the liquid crystal molecule at the point at which x is 0.

3. The liquid crystal lens according to claim 1, wherein the pitch of the cholesteric alignment region is from 0.1 μm to 10 cm.

4. The liquid crystal lens according to claim 1, wherein the liquid crystal molecule in the cholesteric alignment region has a difference ($n_e - n_o$) between an extraordinary refractive index ($n_e$) and an ordinary refractive index ($n_o$) in the range from 0.01 to 0.6.

5. The liquid crystal lens according to claim 1, wherein the lens layer has a thickness in the range from 0.1 to 100 μm.

6. The liquid crystal lens according to claim 1, wherein the liquid crystal molecule is in a crosslinked or polymerized state in the lens layer.

7. The liquid crystal lens according to claim 1, further comprising a base layer, on the surface of which the lens layer is formed.

8. The liquid crystal lens according to claim 7, further comprising a vertical alignment layer between the base layer and the lens layer.

9. An optical filter, comprising:
   a polarization control element configured to control a polarization direction of incident light; and
   the liquid crystal lens of claim 1 disposed such that light emitted from the polarization control element is incident thereon.

10. The optical filter according to claim 9, wherein the polarization control element is configured to emit the incident light by controlling a state of the incident light to be linearly-polarized light perpendicular to a helical axis of the cholesteric alignment region of the liquid crystal lens or linearly-polarized light parallel to the helical axis thereof.

11. A display device, comprising:
    a display element configured to emit image signals comprising image signals for right and left eyes; and the liquid crystal lens of claim 1 disposed such that the image signal emitted from the display element is incident thereon.

12. The display device according to claim 11, wherein the liquid crystal lens is disposed such that a pair of the image signals for right and left eyes are incident on a region corresponding to a ½ pitch of the cholesteric alignment region.

13. The display device according to claim 11, further comprising: a polarization control element between a display element and a liquid crystal lens, and configured to emit the image signals emitted from the display element in a direction of the liquid crystal lens by controlling polarization directions of the image signals.

14. The display device according to claim 13, wherein the polarization control element is configured to emit the image signals by controlling a state of the image signals to linearly-polarized light perpendicular to a helical axis of the cholesteric alignment region of the liquid crystal lens or linearly-polarized light parallel to the helical axis thereof.

* * * * *